(12) United States Patent
Fudge

(10) Patent No.: US 7,831,648 B2
(45) Date of Patent: Nov. 9, 2010

(54) METHOD AND COMPUTER PROGRAM FOR GROUP DELAY AND MAGNITUDE EQUALIZATION WITH RELAXED PHASE SLOPE CONSTRAINT

(75) Inventor: Gerald L. Fudge, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 1259 days.

(21) Appl. No.: 11/393,107

(22) Filed: Mar. 30, 2006

(65) Prior Publication Data

US 2007/0233763 A1    Oct. 4, 2007

(51) Int. Cl.
*G06F 17/10* (2006.01)

(52) U.S. Cl. .................................. 708/323
(58) Field of Classification Search ............. 708/322, 708/323
See application file for complete search history.

(56) References Cited

U.S. PATENT DOCUMENTS

| | | | | |
|---|---|---|---|---|
| 4,395,688 | A * | 7/1983 | Sellers | 333/169 |
| 5,896,306 | A | 4/1999 | Aschwanden | |
| 2003/0169123 | A1 | 9/2003 | Eihama et al. | |
| 2004/0264601 | A1 | 12/2004 | Demir et al. | |
| 2005/0174189 | A1 | 8/2005 | Jin et al. | |
| 2005/0235023 | A1 | 10/2005 | Lee et al. | |
| 2006/0146926 | A1 * | 7/2006 | Bhoja et al. | 375/233 |

OTHER PUBLICATIONS

ISCAS'88; FIR Transfer Functions With Arbitrary Amplitude and Phase, With Application to the Design of Quasi-All-Pass Delay Equalizers; 2489-2492; Blacksburg, VA 24061; 7-9; Jun. 1988.
J.C.E Cabezas, Prof. P.S.R. Diniz, Design of FIR Equalisers by Sharpening Identical Subfilters; 413-417; Oct. 26, 1989; Brazil. Equalization Bibliography.
Southeast University; Xiao-Yu Hu et al.; FFT-Based Block Sequential Least Squares Adaptive FIR Equalizer for Terrestrial HDTV Broadcasting; 141-148; Mar. 3, 1997; USA.

(Continued)

*Primary Examiner*—Chuong D Ngo
(74) *Attorney, Agent, or Firm*—Hovey Williams LLP

(57) ABSTRACT

The present invention is a method and computer program for equalizing group delay and magnitude of a system for which a system response is known. The method and computer program are implemented via a finite impulse response ("FIR") filter for the system, and the method broadly comprises the steps of: evaluating a desired response for the system as a function of an amplitude of the system and a phase of the system; separating the phase of the system into a linear component and a non-linear component; performing a first optimization by minimizing a weighted error between a desired response for the system and a cascaded response for the system as a function of an equalizing filter and a phase slope so as to obtain at least one local smallest error $E(\Omega)$ as a function of phase slope; and once the local smallest error $E(\Omega)$ is known, performing a second optimization to locate any existing global smallest error, wherein the global smallest error is within a set distance from the local smallest error.

23 Claims, 4 Drawing Sheets

Evaluating a desired response for a system as a function of an amplitude of the system and a phase of the system — 110

Separating the phase of the system into a linear component and a non-linear component — 120

Performing a first optimization by minimizing a weighted error between a desired response for the system and a cascaded response for the system as a function of an equalizing filter and a slope of the phase so as to obtain at least one local smallest error $E(\Omega)$ as a function of the slope of the phase — 130

Once the local smallest error $E(\Omega)$ is known, performing a second optimization to locate any existing global smallest error, wherein the global smallest error is within a set distance from the local smallest error — 140

OTHER PUBLICATIONS

Alfred T. Johnson, Jr.; Simultaneous Magnitude and Phase Equalization Using Digital Filters; 319-321; Nov. 1, 1977; Chester, PA.

IEEE Transactions of Instrumentation and Measurement; Istvan Kollar and Yves Rolain; Complex Correction of Data Acquisition Channels Using FIR Equalizer Filters; 920-924; Oct. 5, 1993.

IEEE Transactions on Circuits and Systems—II; Peter Nagel; Frequency-Domain Design Method for Linear-Phase and Minimum-Phase FIR Equalizers; 1347-1351; Nov. 11, 2000.

IEEE Transactions on Circuits and Systems—II; Hyuk J. Oh and Yong H. Lee; Design of Discrete Coefficient FIR and IIR Digital Filters with Prefilter-Equalizer Structure Using Linear Programming; 562-565; Jun. 6, 2000.

IEEE Transactions on Circuits and Systems—II; Soo-Chang Pei and Jong-Jy Shyu; Design of Complex FIR Filters with Arbitrary Complex Frequency Responses by Two Real Chebyshev Approximations; 170-174; Feb. 2, 1997.

IEEE Transactions on Circuits and Systems—II; Soo-Chang Pei, and Jong-Jy Shyu; Eigen-Approach for Designing FIR Filters and All-Pass Phase Equalizers with Prescribed Magnitude and Phase Response; 137-146; Mar. 3, 1992.

IEEE Transactions on Acoustics, Speech, and Signal Processing; Klaus Preuss; On the Design of FIR Filters by Complex Chebyshev Approximation; 702-712; May 5, 1989.

Southern Methodist University; X. Sun and S.C. Douglas; Self-Stabilized Adaptive Allpass Filters for Phase Equalization and Approximation; 444-447; 2000; Dallas, TX.

* cited by examiner

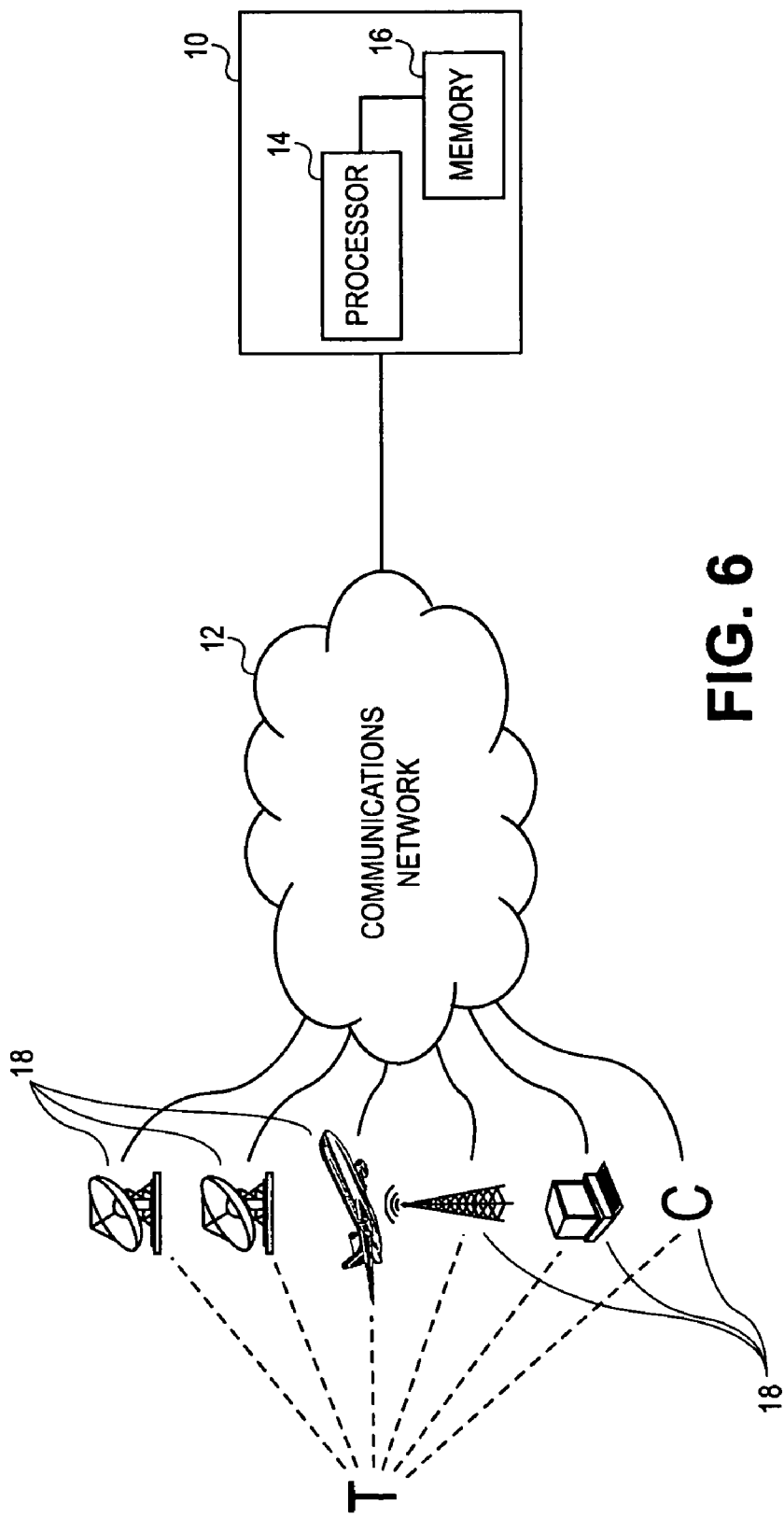

METHOD AND COMPUTER PROGRAM FOR GROUP DELAY AND MAGNITUDE EQUALIZATION WITH RELAXED PHASE SLOPE CONSTRAINT

COMPUTER PROGRAM LISTING APPENDIX

A computer program listing appendix containing the source code of a computer program that may be used with the present invention is incorporated herein by reference and appended hereto as one (1) original compact disc, and an identical copy thereof, containing a total of two (2) files as follows:

| Date of Creation | Size (Bytes) | Filename |
| --- | --- | --- |
| Mar. 30, 2006 | 7,000 (Bytes) | equalize4_exampleFilter |
| Mar. 30, 2006 | 8,000 (Bytes) | equalize5_exampleFilter |

The computer listings and other content of these compact discs are incorporated into the present application by reference.

BACKGROUND OF THE INVENTION

1. Field of the Invention

The present invention relates to filtering techniques for a system comprising a plurality of signals. More particularly, the invention relates to a finite impulse response ("FIR") filter that equalizes group delay and magnitude in the system.

2. Description of the Prior Art

It is often preferable that a filter for a system comprising a plurality of signals is operable to equalize the group delay and magnitude of the system. Historically, infinite impulse response ("IIR") filters have been more commonly used for equalization of the group delay and magnitude than finite impulse response ("FIR") filters. This is because it is more difficult to design an FIR filter to have a non-linear phase than it is for IIR filters. Additionally, IIR filters have been chosen to equalize group delay and magnitude because of the perception that resulting FIR filter lengths will be excessively long.

Although IIR filters have historically been used to equalize group delay and magnitude, a limited number of prior art FIR filters have been designed to equalize group delay and magnitude. FIR filters may be preferred over IIR filters for equalization because FIR filters can be readily implemented in high-speed, low-cost digital hardware. If the equalization is implemented in software, FIR filters are generally simpler to implement because there is not a concern about accumulated round-off and stability problems. Thus, for many applications, FIR filters are preferred over IIR filters.

The typical FIR optimization or approximation technique is to solve for an equalizing filter, $H(\Omega)$, that minimizes a weighted error, $E(\Omega)$, between a desired response, $D(\Omega)$, and a cascaded response:

$$E(\Omega) = [D(\Omega) - F(\Omega)H(e^{i\Omega})]W(\Omega)$$

The desire is to minimize the weighted error across the equalizing FIR filter tap weights:

$$\min_{h(k)} \|E(\Omega)\|$$

where $D(\Omega)$ is the desired response as a function of frequency, $F(\Omega)$ is the given or known response to be equalized, $h(k)$ is the equalizing FIR filter tap weights, and $W(\Omega)$ is the weighting.

As can be understood by one with ordinary skill in the art, this optimization technique optimizes only across the filter tap weights. Therefore, the minimization is performed on both the linear and non-linear components of a phase of the system. As such, the slope of the phase is arbitrary for each application of the optimization. This results in an equalization of the group delay and magnitude that is generally poor.

Additionally, because the system response is known, and therefore the phase response is known, and further because the optimization does not fix any component of the phase, the prior art FIR filter described above matches the desired phase response with the known phase response. Unfortunately, this matching is not consistently successful and is too dependent on the occurring phase slope.

Accordingly, there is a need for an improved filter that better equalizes group delay and magnitude. Specifically, there is a need for an improved filter design that fixes the phase slope as a parameter in the optimization or minimization, thus minimizing only the non-linear portion of the phase.

SUMMARY OF THE INVENTION

The present invention solves the above-described problems and provides a distinct advance in the art of filter design for an FIR filter. More particularly, the present invention provides a method and computer program for filtering that equalizes group delay and magnitude in a system comprising a plurality of signals.

The method and computer program of the present invention broadly comprises the steps of evaluating a desired response for the system as a function of an amplitude of the system and a phase of the system; separating the phase of the system into a linear component and a non-linear component; performing a first optimization by minimizing a weighted error between a desired response for the system and a cascaded response for the system as a function of an equalizing filter and a phase slope so as to obtain at least one local smallest error $E(\Omega)$ as a function of phase slope; and once the local smallest error $E(\Omega)$ is known, performing a second optimization to locate any existing global smallest error, wherein the global smallest error is within a set distance from the local smallest error.

The present invention thus relaxes or otherwise removes a phase slope constraint by optimizing across the phase slope, thus resulting in minimizing the non-linear component of the phase. Optimizing across the phase slope, i.e., varying the linear portion of the phase, results in better overall optimization of the parameters of interest, such as group delay and magnitude of the system.

BRIEF DESCRIPTION OF THE DRAWING FIGURES

A preferred embodiment of the present invention is described in detail below with reference to the attached drawing figures, wherein:

FIG. 6 is a block diagram of the components for implementing the method of the present invention.

Figure 1:
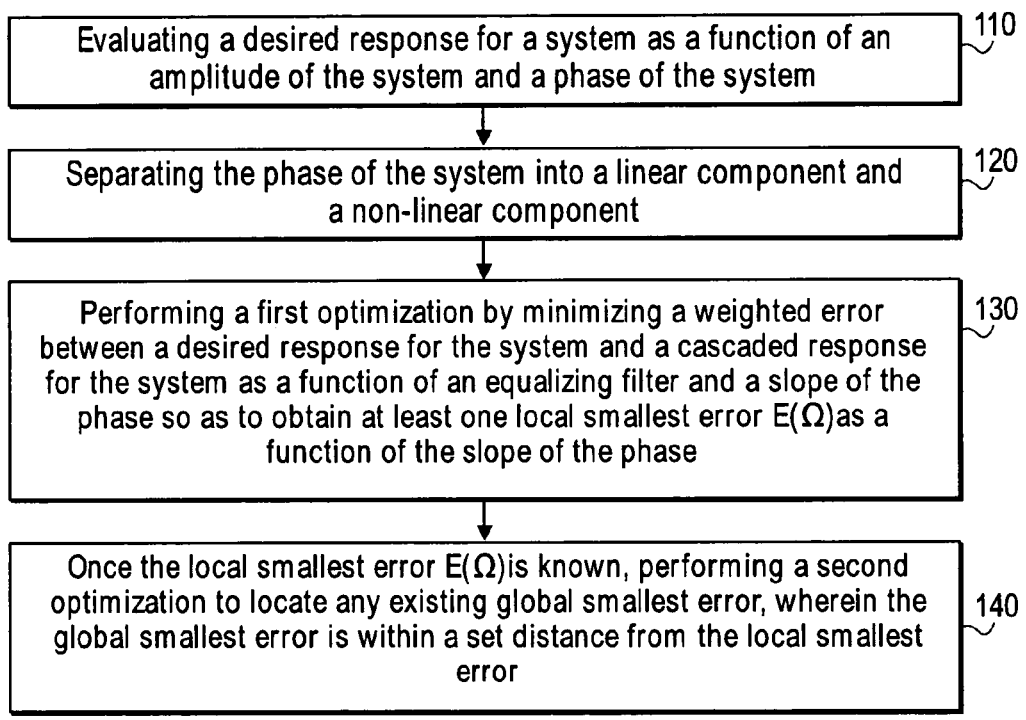
FIG. 1 is a flowchart of a plurality of steps performed for implementing the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention is a method for filtering a system comprising a plurality of signals so as to equalize group delay and magnitude of the system, i.e., to minimize a group delay variation and a magnitude variation of the system. A response of the system, or system response, is preferably known, and the filter is preferably a finite impulse response ("FIR") filter. As is well understood in the art, the group delay of a system comprising a plurality of signals is the rate of change, with respect to an angular frequency, of a total phase shift of the system. A magnitude of the system is the amplitude response as a function of frequency. In a preferred embodiment of the invention and as discussed fully below, the method and computer program provide for separating a phase of the system into linear and non-linear components and varying the linear portion of the phase, comprising a slope of the phase, to allow for better overall optimization of parameters of interest, such as group delay variation and magnitude variation.

A flowchart of steps that are performed by the filter described herein is provided in FIG. 1. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 1. For example, two blocks shown in succession in FIG. 1 may in fact be executed substantially concurrently, or the blocks may sometimes be executed in the reverse order depending upon the functionality.

It is known that the phase of a system can be expressed as $\sigma\Omega+\theta(\Omega)$, where the phase is separated into a linear component comprising $\sigma\Omega$ and a non-linear component comprising $\theta(\Omega)$ and further where $\Omega$ is a frequency of the system. If on is the linear component of the phase, then $\sigma$ is the slope of the phase, herein also referred to as "phase slope." It is expressly noted that use of the word "linear" herein can be understood to mean a straight line. The present invention recognizes that in many filtering applications that seek to equalize group delay and magnitude, such as electronic intelligence, the linearity of the phase is of primary importance. The desire is for the phase to be as linear as possible; the actual slope of the phase is not as important as the phase being linear. By separating the linear and non-linear components, the present invention better minimizes the non-linear components, resulting in significantly improved group delay and magnitude equalization.

As discussed above, a typical prior art FIR approximation or optimization method of equalizing the group delay and magnitude is to solve for an equalizing filter that minimizes a weighted error between a desired response of the system and a cascaded response of the system. Because the system response is known, the phase response is consequently known and is therefore a given, fixed phase response. The prior art FIR optimization attempts to match the given phase response with a desired phase response, which in effect constrains the phase slope. Therefore, the term "phase slope constraint" as used herein is to be understood as any implicit constraint on the phase slope due to matching the desired phase response with the given phase response defined by the known system response.

The present invention recognizes that employing the phase slope constraint in the optimization is frequently unnecessary. The present invention thus removes this constraint by separating the phase into linear and non-linear components, identifying the phase slope from the non-linear component of the phase, and optimizing across the phase slope, thus allowing the phase slope to vary, as further described below. Relaxing or otherwise removing the phase slope constraint results in better optimization of the non-linear phase and magnitude because the degrees of freedom are not used on insignificant parameters, such as phase slope.

For the system for which the response is known, the method of the present invention broadly comprises the following steps: evaluating a desired system response as a function of an amplitude of the system and a phase of the system, noted in step 110 of FIG. 1; separating the phase of the system into the linear and non-linear components, step 120; performing a first optimization by minimizing a weighted error between a desired response for the system and a cascaded response for the system as a function of an equalizing filter and a slope of the phase so as to obtain at least one local smallest error $E(\Omega)$ as a function of phase slope, step 130; and once the local smallest error $E(\Omega)$ is known, performing a second optimization to locate any existing global smallest error, wherein the global smallest error is within a set distance from the local smallest error, step 140.

Although the system response as herein described is known, as can be understood by one with ordinary skill in the art, the system response may be approximately known, such that "known system response" as used herein is to be understood as any system response that is known or approximately known.

The desired system response, $D(\Omega)$, is preferably first expressed as a function of the amplitude, $A(\Omega)$, of the desired system and the phase, as noted in step 110 of FIG. 1. Further, the phase is preferably separated into linear and non-linear components, as discussed above and as noted in step 120, such that the desired system response can be written as follows:

$$D(\Omega)=A(\Omega)e^{-i(\sigma\Omega+\theta(\Omega))}$$

As also noted above, the system response is known. In contrast, a desired system response is the system response after application of the present invention, i.e., after application of the equalization optimization. As used herein, "system response" is understood to refer to the given or known system response, and "desired system response" is understood to refer to the system response after equalization.

In a first optimization, noted in step 130, a weighted error, $E(\Omega)$, between the desired system response and a cascaded system response is minimized as a function of equalizing filter tap weights, $h(k)$, and the phase slope, $\sigma$:

$$\min_{h(k),\sigma} \|E(\Omega)\|$$

Because the first optimization fixes the value of the phase slope for each minimization iteration performed, the first optimization only minimizes the non-linear portion of the phase. This is desirable since the linearity of the phase, and not the phase slope, is of primary importance. Importantly, separation of the phase slope from the optimization problem so that the phase slope constraint can be relaxed or otherwise not included in the desired system response results in using the phase slope as a parameter in the first optimization.

Minimizing the weighted error across the filter tap weights and the phase slope results in a minimum error value. The minimization of the first optimization is preferably performed across a plurality of filter tap weight values and phase slope values, which results in a plurality of errors corresponding to the plurality of phase slope values. From the calculated phase slope values, the smallest error is a local minima, herein referred to as a "local smallest error." The minimization may be performed with any known approximation technique, such as frequency domain or Chebyschev, and it may be that the smallest error is lower at a different phase slope value for one approximation technique as compared to another approximation technique. Additionally, there may be more than one local minima, as can be appreciated by one with ordinary skill in the art.

The phase slope values chosen for the first optimization are within a prescribed first grid of slope values. As can be appreciated, a density of slope values within the first grid will provide how many slope values are minimized across a certain range. If the first grid density is fine, more slope values are included within the provided range. Conversely, if the first grid density is coarse, less slope values are included within the provided range. As can be appreciated by one with ordinary skill in the art, selection of a grid density will be dictated by the particular filter length and equalization problem.

It is also noted that if the grid density is too dense or too coarse, less than optimum results will be obtained. Therefore, a frequency step size, deltaF, related to a frequency of phase slope values within the grid (i.e., a number of phase slope values or points in the grid), should be verified. A method of verifying deltaF is to vary the deltaF by factors of two to find the approximate deltaF yielding better local minima.

Because the local smallest error may not be an actual smallest error, due to the coarseness of the chosen first grid density, a second optimization, noted in step 140, is performed to insure the local smallest error is the actual smallest error, herein referred to as a "global smallest error." The second optimization is similar to the first optimization, except that the minimization is preferably performed on a finer grid density using the preferred approximation technique, such as frequency domain or Chebyschev, and it may be that a different approximation technique is used for the second optimization.

The finer grid density, herein referred to as the second grid density, preferably comprises a plurality of phase slope values that are a subdivision or refinement of the phase slope values comprised within the first grid density, i.e., the phase slope values contained within the second grid density are within the range of slope values for the first grid density. As such, the second grid density will herein be referred to as a subdivision of the first grid density. Additionally, the slope values within the second grid density are preferably within a predetermined range from the slope value corresponding to the local smallest error.

It should be specifically understood that the second grid density may include a set of phase slope values that are not a subset of the first grid density but that are a subdivision of the first grid density. For example, if the first grid density includes the set of slope values: FGD={1, 2, 5, 5.5, 10}, with the range for the first grid density being 0 through 11, then the second grid density may include the set of slope values: SGD={0.2, 2.1, 5.05, 6, 10.95}. Therefore, it is understood that the second grid density includes a set of slope values that are contained with a prescribed range of slope values for the first grid density, and are thus a subdivision of the first grid density, but that the slope values for the second grid density may not necessarily be a subset of the first grid density.

The second optimization searches for any minima within the second grid density. If any minima are found that are smaller than the local smallest error, i.e., the local smallest error from the first optimization, then it is determined if an optimization tolerance criteria is met. If the tolerance criteria is met, then the smallest of said minima is the global smallest error. If the tolerance criteria is not met and minima smaller than the local smallest error are found, it is consequently known that the local smallest error is not the actual smallest error. Similarly, if no minima smaller than the local smallest error are found, then it is known that the local smallest error is the actual smallest error, i.e., the global smallest error.

If the tolerance criteria is not met, then a third optimization, similar to the second optimization, is performed on an even finer grid density, such that the grid density for the third optimization, herein referred to as the third grid density, is a subdivision of the second grid density. As can be appreciated, multiple iterations of the optimizations can be performed until the optimization tolerance criteria is met. With each iteration, the grid density for the iteration will preferably be a subdivision of the previous iteration(s), such that the phase slope values for which the minimization of the optimization is performed are comprised of an increasingly finer grid density.

The optimization tolerance criteria will be application specific and can be a fixed, defined criteria or can be as basic as whether the optimization being performed results in better performance of the filter. An exemplary fixed criteria is that the filter meets a particular, predefined group delay variation and magnitude variation. Alternatively, the criteria could select the best magnitude equalization over all phase slope values that results in the group delay equalization criteria being met. Similarly, the criteria could select the best group delay equalization over all phase slope values that results in the magnitude equalization criteria being met. A further alternative criteria could entail a comparison of the equalized group delay and magnitude as compared to the previous optimization iteration, with the criteria being when the performance ceases improving by a certain percentage. An even further alternative criteria might be the best group delay and magnitude equalization within a particular bandwidth.

As a consequence of minimizing the weighted error over all phase slope values within the chosen grid density so as to obtain a minimum group delay variation (i.e., equalize group delay), a minimum magnitude variation is also obtained. Thus, the magnitude of the system is equalized at the same time as the group delay is equalized by choosing the phase slope value that results in an acceptable combination of magnitude variation and group delay variation. As can be appreciated by one with ordinary skill in the art, what is an "acceptable" group delay and magnitude variation will depend of the system and application.

The present invention and its teaching of separating the phase into linear and non-linear components and varying the phase slope can also be applied to other criteria, such as choosing a phase slope value that minimizes only the group delay variation, choosing a phase slope value that minimizes only the magnitude variation, and/or minimizing a weighted sum of these two variations. Phase slope may also be a parameter that you vary to obtain other criteria, such as a preferred bandwidth. Therefore, although the present invention is discussed with reference to minimizing group delay and magnitude variation, the present invention may also be applied to obtain other criteria or parameters of interest.

Figure 2:
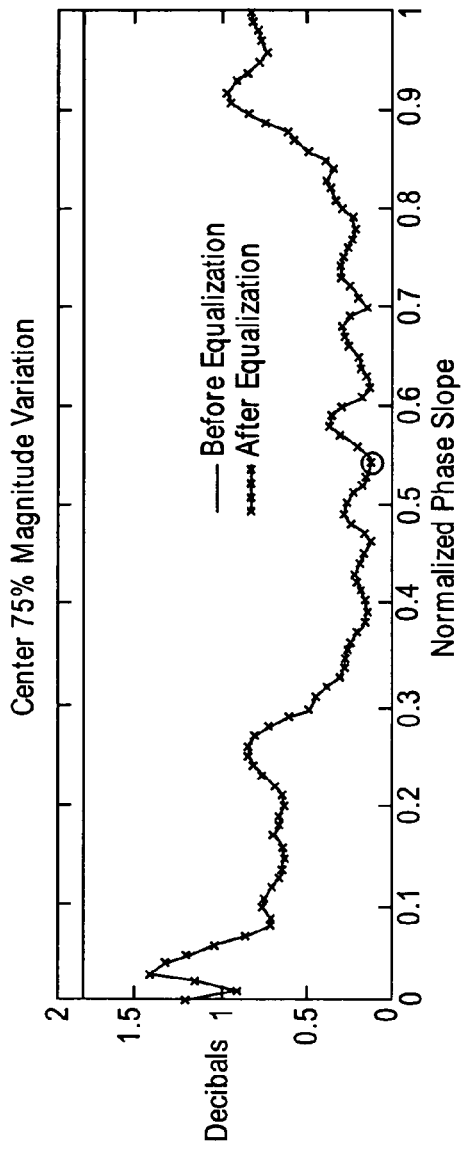
FIG. 2 is a graph illustrating a magnitude variation across a center 75% of bandwidth as a function of a normalized phase slope.
Figure 3:
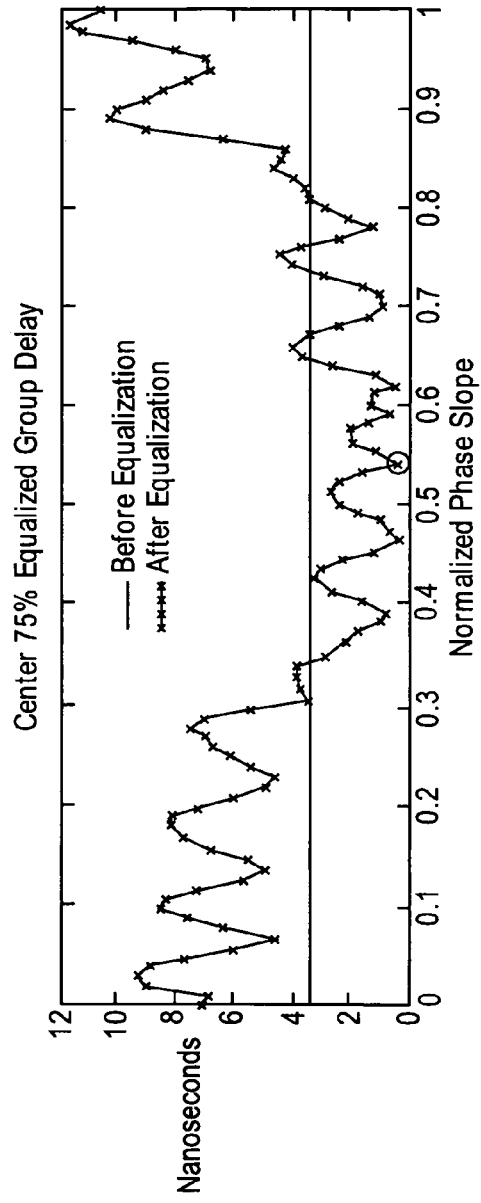
FIG. 3 is a graph illustrating a group delay variation across a center 75% of bandwidth as a function of the normalized phase slope.

The results obtained by application of the present invention are illustrated in the graphs provided in FIGS. 2-5. FIG. 2 illustrates the magnitude variation across a center 75% of bandwidth as a function of a normalized phase slope. The solid line represents the magnitude variation before equalization, and the line marked with an "x" represents the magnitude variation after equalization. As can be seen, the magnitude variation prior to equalization is approximately 1.8 dB. In FIG. 3, the group delay variation across a center 75% of bandwidth is plotted against the normalized phase slope. Again, the solid line represents the group delay variation prior to equalization, and the line marked with an "x" represents the group delay variation after equalization. The group delay variation prior to equalization is approximately 3.4 ns. Both the plots of FIGS. 2 and 3 indicate that the optimum equalization filter, i.e., the minimum error, occurs when the normalized phase slope is equal to 0.54, highlighted by the circle on the line marked with an "x" in both FIGS. 2 and 3. With this phase slope value, the magnitude variation is reduced from about 1.8 dB to about 0.15 dB, and the group delay variation is reduced from 3.4 ns to about 0.4 ns.

Figure 4:
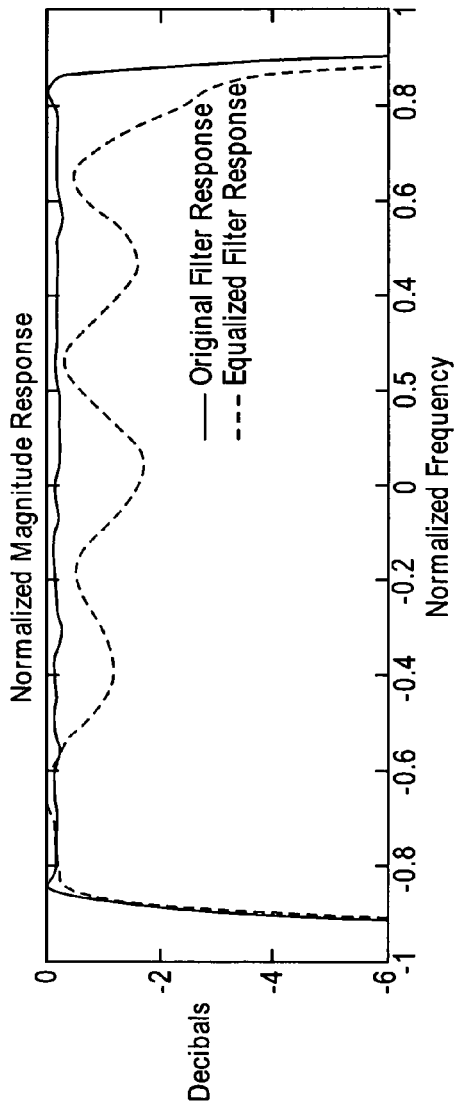
FIG. 4 is a graph illustrating an original filter response for magnitude as a function of the normalized frequency before equalization and after equalization.
Figure 5:
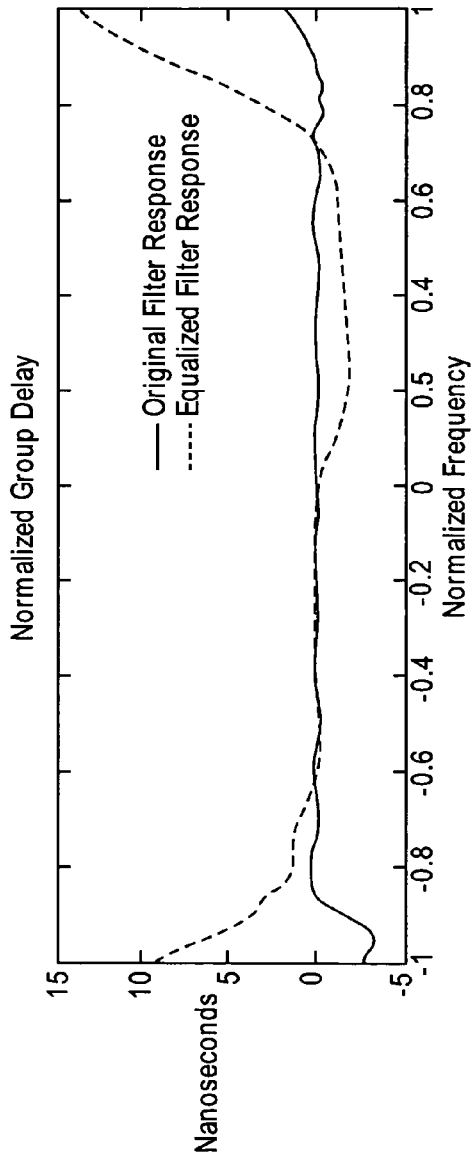
FIG. 5 is a graph illustrating an original filter response for group delay as a function of the normalized frequency before equalization and after equalization.

FIGS. 4 and 5 correspond, respectively, to FIGS. 2 and 3 and illustrate the original filter response as a function of normalized frequency before equalization, indicated by the hatched lines, and the filter response after equalization, indicated by the solid lines, using the present invention with a phase slope value of 0.54. FIG. 3, which illustrates the normalized magnitude response, shows that application of the present invention has increases the bandwidth considerably. FIG. 4, which illustrates the normalized group delay, shows that application of the present invention has reduced the group delay variation across the full bandwidth from about 16 ns to about 5 ns. As can be appreciated, this reduction in group delay and magnitude variation is considerable.

The above-described method is especially well-suited for implementation by a computing element 10, as illustrated in FIG. 6. The computing element 10 may be part of a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various conventional devices, such as microcontrollers, microprocessors, programmable logic devices, etc. Further, the computing element 10 may include additional devices, such as a display for indicating processed information, or additional processing and memory elements. Further, the computing element 10 may comprise a plurality of computing elements or a network of computing elements such that one or more portions of the invention may be implemented utilizing a first computing element and one or more other portions of the invention may be implemented utilizing a second computing element.

In operation, a receiver response is first measured, or alternatively, a key portion of the receiver response is measured where the most group delay variation is known to occur. The present invention is then implemented to develop an equalization filter, and the filter is loaded into digital signal processing ("DSP") downstream of analog-to-digital conversion ("ADC"), i.e., downstream of where real digital data is converted to complex I/Q data. At this point, an equalized receiver system is operational. The receiver system generally comprises an antenna, defined below generally as a collector element 18; a low noise amplifier; a downconversion system; and an IF digital receiver. Preferably, the IF digital receiver has an anti-alias filter, an ADC, and a DSP (in either hardware, firmware, or software). Additional amplifiers may be included, and there may be no need for a separate downconversion system for direct digitizers. Further, the receiver system may include additional RF switches and other distribution components. Although the group delay variation that is removed by the present invention may occur in all of the above components, the filters in the downconversion system and the anti-alias filter before ADC are often primary contributors.

The present invention can be implemented in hardware, software, firmware, or combinations thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program preferably comprises an ordered listing of executable instructions for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media.

In the context of this application, a "computer-readable medium," including the memory 16, can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

As shown in FIG. 6, the computing element 10 is preferably directly or indirectly coupled with one or more collector elements 18 to enable function of the present invention as described herein. It should be appreciated the computing element 10 and the collector elements 18 may be integral such as where one or more of the collector elements 18 are operable to independently perform the filtering method described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal. Thus, the collector elements 18 may include stationary and non-stationary antennas, uni-directional and omni-directional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector elements 18.

Although the invention has been described with reference to the preferred embodiment illustrated in the attached drawing figures, it is noted that equivalents may be employed and substitutions made herein without departing from the scope of the invention as recited in the claims. For example, an alternative embodiment of the present invention does not require separation of the phase into linear and non-linear components and minimization of the non-linear portion of the phase. In the alternative embodiment, the optimization discussed above is applied across the entire phase response, as opposed to optimizing only the non-linear portion of the phase. The result is that the optimization is performed across a wider range of phase slope values than if the optimization was performed only on the non-linear portion of the phase. As can be appreciated by one with ordinary skill in the art, optimization over a smaller range of phase slope values, i.e. a finer grid density, likely results in better location of a minima. However, the discussed alternative embodiment will result in location of a minima, with the result that multiple optimizations with increasingly finer grid densities may be need to be performed.

Having thus described the preferred embodiment of the invention, what is claimed as new and desired to be protected by Letters Patent includes the following:

The invention claimed is:

1. A method for equalizing a group delay and a magnitude of a system, the method comprising the steps of:
  separating a phase of the system into a linear component and a non-linear component so as to identify a phase slope associated with the linear component; and
  performing, using a processor, an optimization by minimizing a weighted error between a desired response for the system and a cascaded response for the system as a function of an equalizing filter and the phase slope so as to obtain a smallest error $E(\Omega)$ as a function of the phase slope.

2. The method for equalizing as claimed in claim 1, wherein the method is employed in application of a finite impulse response filter, and a response for the system is known.

3. The method for equalizing as claimed in claim 1, wherein the non-linear component of the phase is minimized due to performing the optimization by minimizing as a function of the phase slope.

4. The method for equalizing as claimed in claim 1, wherein a phase slope constraint is relaxed due to the separating the phase of the system into the linear and non-linear components.

5. The method for equalizing as claimed in claim 1, wherein the optimization is performed using an approximation technique for calculating a minimum error as a function of the phase slope.

6. A method of filtering a system so as to equalize a group delay and a magnitude of the system, wherein a response for the system is known and further wherein a filter is a finite impulse response ("FIR") filter, the method of filtering comprising the steps of:
  evaluating a desired response for the system as a function of an amplitude of the system and a phase of the system;
  separating the phase of the system into a linear component and a non-linear component;
  performing, using a processor, a first optimization by minimizing a weighted error between a desired response for the system and a cascaded response for the system as a function of an equalizing filter and a phase slope associated with the linear component so as to obtain at least one local smallest error $E(\Omega)$ as a function of phase slope; and
  once the local smallest error $E(\Omega)$ is known, performing, using a processor, a second optimization to locate any existing global smallest error, wherein the global smallest error is within a set distance from the local smallest error.

7. The method of filtering as claimed in claim 6, wherein the first optimization is performed using an approximation technique for calculating a minimum error as a function of the phase slope.

8. The method of filtering as claimed in claim 7, wherein the first optimization further comprises searching for the local smallest error within a first grid density of slope values.

9. The method of filtering as claimed in claim 8, wherein the second optimization comprises checking for the global smallest error with a second grid density of slope values that is a subdivision of the first grid density of slope values.

10. The method of filtering as claimed in claim 9, wherein the checking for the global smallest error within the second grid density of slope values further comprises applying the approximation technique for each of the slope values within the second grid density.

11. The method of filtering as claimed in claim 10, wherein after performing the second optimization, if at least one local smallest error is found, then further searching for error values within a third grid density that is a subdivision of the second grid density.

12. The method of filtering as claimed in claim 6, wherein the non-linear component of the phase is minimized.

13. A computer program for filtering a system so as to equalize a group delay and a magnitude of the system, wherein a response for the system is known, a filter is a finite impulse response ("FIR") filter, and the computer program is stored on a non-transitory computer-readable medium for operating a computing element, the computer program comprising:
- a code segment operable to be executed by the computing element for evaluating a desired response for the system as a function of an amplitude of the system and a phase of the system;
- a code segment operable to be executed by the computing element for separating the phase of the system into a linear component and a non-linear component;
- a code segment operable to be executed by the computing element for performing a first optimization by minimizing a weighted error between a desired response for the system and a cascaded response for the system as a function of an equalizing filter and a phase slope associated with the linear component so as to obtain at least one local smallest error $E(\Omega)$ as a function of phase slope; and
- once the local smallest error $E(\Omega)$ is known, a code segment operable to be executed by the computing element for performing a second optimization to locate any existing global smallest error, wherein the global smallest error is within a set distance from the local smallest error.

14. The computer program as claimed in claim 13, wherein the first optimization is performed using an approximation technique for calculating a minimum error as a function of the phase slope.

15. The computer program as claimed in claim 14, wherein the first optimization further comprises searching for the local smallest error within a first grid density of slope values.

16. The computer program as claimed in claim 15, wherein the second optimization comprises checking for the global smallest error with a second grid density of slope values that is a subdivision of the first grid density of slope values.

17. The computer program as claimed in claim 16, wherein the checking for the global smallest error within the second grid density of slope values further comprises applying the approximation technique for each of the slope values within the second grid density.

18. The computer program as claimed in claim 17, wherein after performing the second optimization, if at least one local smallest error is found, then further searching for error values within a third grid density that is a subdivision of the second grid density.

19. The computer program as claimed in claim 13, wherein the non-linear component of the phase is minimized.

20. A method of filtering a system so as to equalize a group delay and a magnitude of the system, wherein a response for the system is known and further wherein a filter is a finite impulse response ("FIR") filter, the method of filtering comprising the steps of:
- evaluating a desired response for the system as a function of an amplitude of the system and a phase of the system,
- separating the phase of the system into a linear component and a non-linear component so as to identify a phase slope associated with the linear component; and
- optimizing, using a processor, across an entire phase response of the system by minimizing a weighted error between a desired response for the system and a cascaded response for the system as a function of an equalizing filter and the phase slope so as to obtain at least one smallest error $E(\Omega)$ as a function of phase slope.

21. The method of filtering as claimed in claim 20, further comprising the step of:
- once the smallest error $E(\Omega)$ is known, performing a second optimization to locate any existing global smallest error, wherein the global smallest error is within a set distance from the smallest error.

22. The method of filtering as claimed in claim 20, wherein a phase slope constraint is relaxed due to optimization across the entire phase response.

23. The method of filtering as claimed in claim 20, wherein the optimization is performed using an approximation technique for calculating a minimum error as a function of the phase slope.

* * * * *